(12) United States Patent
Li et al.

(10) Patent No.: US 7,414,919 B2
(45) Date of Patent: Aug. 19, 2008

(54) METHOD FOR IMPROVING THE SEISMIC RESOLUTION

(75) Inventors: Zishun Li, Daqing (CN); Youmei Xu, Daqing (CN)

(73) Assignee: Petrochina Co., Ltd., Beijing (CN)

( * ) Notice: Subject to any disclaimer, the term of this patent is extended or adjusted under 35 U.S.C. 154(b) by 0 days.

(21) Appl. No.: 11/156,787

(22) Filed: Jun. 20, 2005

(65) Prior Publication Data
US 2005/0286344 A1  Dec. 29, 2005

(30) Foreign Application Priority Data
Jun. 25, 2004  (CN)  .................. 2004 1 0049996

(51) Int. Cl.
*G01V 1/28* (2006.01)
*G01V 1/36* (2006.01)

(52) U.S. Cl. .................. 367/54; 367/25; 367/38; 367/50; 367/57

(58) Field of Classification Search ............... 367/25, 367/37–38, 40, 50–52, 54, 57
See application file for complete search history.

(56) References Cited

U.S. PATENT DOCUMENTS

| 5,191,557 | A | * | 3/1993 | Rector et al. ............ 367/41 |
| 5,197,038 | A | * | 3/1993 | Chang et al. ............ 367/28 |
| 5,237,538 | A | * | 8/1993 | Linville et al. ............ 367/52 |
| H1307 | H | * | 5/1994 | Krohn ............ 367/57 |
| 5,583,825 | A | * | 12/1996 | Carrazzone et al. ............ 367/31 |
| 5,764,516 | A | * | 6/1998 | Thompson et al. ............ 367/54 |
| 6,049,759 | A | * | 4/2000 | Etgen ............ 702/14 |
| 6,081,482 | A | * | 6/2000 | Bevc ............ 367/54 |
| 6,131,694 | A | * | 10/2000 | Robbins et al. ............ 181/105 |
| 6,430,508 | B1 | * | 8/2002 | Sudhakar et al. ............ 702/17 |
| 2004/0076077 | A1 | * | 4/2004 | Robertsson et al. ............ 367/15 |

* cited by examiner

*Primary Examiner*—Jack W Keith
*Assistant Examiner*—Scott A Hughes
(74) *Attorney, Agent, or Firm*—Hedman & Costigan, P.C.

(57) ABSTRACT

A method for improving the seismic resolution in the field of petroleum exploration and development, using the steps of: (1) ensuring the depth and the velocity of the low-velocity layer and the high-velocity layer and the characteristic of the frequency spectrum of the seismic wave at the near-surface using the borehole seismic survey; (2) separating the ghost wave from the seismic record in the high-velocity layer using the processing method of the vertical seismic profiling, and improving the SNR of the seismic record of the direct wave at the high-velocity layer using the uphole stacking of the vertical seismic profiling; (3) evaluating the de-convolution operator of the near-surface by the convolution math-physics equation; (4) evaluating the seismic record with high resolution by the de-convolution math-physics equation; (5) providing the band-pass filtering and geologic interpretation to the seismic record with high resolution. Using this method, the apparent dominant frequency may reach 200 Hz and higher, the vertical seismic resolution is improved, and the problem of recognizing the thin layer by the present seismic exploration is resolved.

1 Claim, 3 Drawing Sheets

METHOD FOR IMPROVING THE SEISMIC RESOLUTION

FIELD OF THE INVENTION

The invention relates to a method in the field of petroleum exploration and development, especially to a method for improving the seismic resolution in the field of seismic exploration.

TECHNICAL BACKGROUND OF THE INVENTION

The seismic record is the recorded result of the seismic wavelet, which is produced by the hypocenter, recorded after the seismic wavelet spreads to the underground and is reflected back to the ground when met by the reflecting boundary. The vertical seismic resolution depends on the dominant frequency of the seismic wavelet, which is affected by the excited condition and spread condition. When the hypocenter of the seismic dynamite is generated, the wave dispersion of the seismic wavelet is improved by the amount of the dynamite or loosed by the stratum at the point of the detonation, therefore the dominant frequency of the seismic wavelet will be lowered. The attenuation, such as absorption, scattering, etc. takes place during the spreading process of the seismic wavelet. The seismic wavelet continues to improve with distortion. In particular, when the seismic wavelet is spreading at the near-surface, the attenuation and the wave dispersion of the seismic wavelet are relatively large. The amount of the attenuation each meter of the near-surface is relatively 500-1000 times higher than that of the high-velocity layer. The attenuation of the seismic wave is different due to the difference of the altitude of the near-surface and the lithology of the stratum.

it is effective to improve the vertical seismic resolution using processing technology, such as the field acquisition of the present high resolution and the static correction, spectra albino, wavelet de-convolution, anti-Q filtering, and the like. However, the apparent dominant frequency cannot be sufficient for the need of recognizing the thin layer in the present seismic exploration, since it can only be improved to around 60 Hz.

THE SUMMARY OF THE INVENTION

In order to overcome the shortcomings of the prior art, that the apparent dominant frequency of the seismic wave cannot be sufficient for the need of recognizing the thin layer in the present seismic exploration, since it can only be improved to around 60 Hz, the method of the present invention is provided for improving the seismic resolution. This method of improving the seismic resolution can enhance the apparent dominant frequency of the seismic to 200 Hz and higher, improve the vertical seismic resolution, and resolve the problem that it is difficult to recognize the thin layer in the present seismic exploration.

The starting point of the conception in accordance with the present invention is to recover the seismic wave received by the ground seismic data to the seismic wave produced by the small dose of dynamite in the high-velocity layer and the seismic wave received in the high-velocity layer that is below the low-velocity layer, compensate the influence to the seismic wave caused by the attenuation and the wave dispersion of the seismic wave at the near-surface, therefore, envisage the subject of improving the vertical seismic resolution.

The technical embodiment is detailed below, i.e., this method essentially comprises the steps of:

(1) obtaining the vertical seismic record $x_i(t)$ at the near-surface of the ground by using the borehole seismic survey, ensuring the depth and the velocity of the low-velocity layer and the high-velocity layer and characteristic of the frequency spectrum of the seismic wave at the near-surface of the ground, wherein $x_0(t)$ is the curve of the vertical seismic record at the near-surface of the ground when $i=0$, and indicates the seismic record of the physical characteristics of the ground surface; and $x_n(t)$ is the curve of the vertical seismic record at the near-surface of the ground when $i=n$, n is a certain depth, and indicates the seismic record of the physical characteristics of the high-velocity layer at a certain base level depth below the low-velocity layer;

(2) separating the ghost wave of $x_i(t)$ from the high-velocity layer by using a method of the vertical seismic profiling, improving the signal-to-noise ratio (SNR) of the seismic record of the direct wave $x_n(t)$ at the high-velocity layer by using a uphole stacking of the vertical seismic profiling, and providing the static correction to the $x_0(t)$ seismic record;

(3) establishing a convolution math-physics equation between the seismic waves of the borehole seismic survey $x_0(t)$ and $x_n(t)$, $x_0(t)=x_n(t)* s(t)$, or $X_0(f)=X_n(f) S(f)$, evaluating the de-convolution operator of the near-surface: $s^{-1}(t)=x_n(t)* x_0^{-1}(t)$, or $S^{-1}(f)=X_n(f) X_0^{-1}(f)$, wherein $X_0(f)$ is the Fourier transform of $x_0(t)$, $X_n(f)$ is the Fourier transform of $x_n(t)$, $s(t)$ is the convolution operator of the near-surface, $S(f)$ is the Fourier transform of $s(t)$;

(4) establishing a de-convolution math-physics equation of the seismic record around the ground of the borehole seismic survey using the de-convolution operator of the near-surface and the seismic record of the ground, evaluating the high resolution of the seismic record, $w(t)=g(t)* s^{-1}(t)$, or $W(f)=G(f) S^{-1}(f)$, wherein $g(t)$ is the seismic record of the ground, $G(f)$ is the Fourier transform of $g(t)$, $w(t)$ is the seismic record of the high resolution, which is attained after compensating the attenuation of the near-surface seismic wave by the de-convolution operator, and $W(f)$ is the Fourier transform of $w(t)$;

(5) providing the band-pass filtering and geological interpretation to the seismic record with high resolution evaluated.

The vertical seismic record at the near-surface obtained by borehole seismic survey in the above step (1) may be obtained by using the cross borehole seismic survey, or obtained using the uphole seismic survey, wherein the seismic record $x_0(t)$, which is in response to the ground physical characteristic, can be replaced by the first break wave in the conventional seismic exploration.

Moreover, the vertical seismic record at the near-surface in above step (1), which is obtained by the borehole seismic survey, may adopt the same amount of the dynamite at the different excited points, and may also adopt a different amount of dynamite at the same excited point.

The direct wave $x_n(t)$ in the above step (2) is the record of a certain depth of high SNR in the high-velocity layer, wherein the SNR of the direct wave $x_n(t)$, which is improved by using the uphole stacking of the vertical seismic profiling, is that the values of $\ldots x_{n-2}(t), x_{n-1}(t), x_{n+1}(t), x_{n+2}(t) \ldots$ are static corrected to the same time of the seismic record of $x_n(t)$ by using the velocity of the high-velocity layer, and then the values of $\ldots x_{n-2}(t), x_{n-1}(t), x_{n+1}(t), x_{n+2}(t) \ldots$ are stacked to improve the SNR of the direct wave $x_n(t)$. In this step, the static correction for the seismic record is to remove the difference of the first break time between $x_0(t)$ and $x_n(t)$.

The circumference of the borehole seismic survey is above step (4) is a range from several hundred meters to several decades kilometers, and the adopting distance of the recorded time is 0.25 ms. The excited record at 0.5 m is called $x_0(t)$, the record at 10.5 m is called $x_{10}(t)$. From the results measured in this log, the depth of the low-velocity layer is between 0.5-6 m, the velocity of the low-velocity layer is 360 m/s, the depth of the high-velocity layer is higher than the range of 6-33 m, and the velocity of the high-velocity layer is 1700 m/s, which are shown in FIG. 1. The dominant energy range of $x_0(t)$ is between 10-200 Hz, and the dominant energy range of $x_{10}(t)$ is between 30-1400 Hz, which are obtained from the spectrum analysis of the measured result.

According to step (2) of the said method of the present invention, the ghost wave is separated from $x_i(t)$ by using the method of the vertical seismic profiling.

According to step (2) of the said method of the present invention, $x_8(t)$, $x_9(t)$, $x_{11}(t)$, $x_{12}(t)$ may be corrected to the same time of $x_{10}(t)$ by using the uphole stacking of the vertical seismic profiling. The SNR of the direct wave $x_{10}(t)$ at the 10 m depth of the log may be improved by five stacking. $x_0(t)$ may be corrected to the same time of $x_{10}(t)$, $x_0(t)=x_0(t-20)$.

According to step (3) of the said method of the present invention, a convolution math-physics equation: $X_0(f)=X_{10}(f) S(f)$ is established, which is used when the seismic wave of the borehole seismic survey spreads at the near-surface. The de-convolution operator at the near-surface: $S^{-1}(f)=X_{10}(f) X_0^{-1}(f)$ is evaluated (resample $x_0(t)$ and $x_{10}(t)$ before the Fourier transform of $X_{10}(f)$ and $X_{10}(f)$, the sampling interval is 1 ms, and total sampling points are 70).

According to step (4) of the said method of the present invention, a de-convolution math-physics equation of the migrated profiling record is established, which is used for the SX-line seismic profile around the ground of the borehole seismic survey, by using the de-convolution operator of the near-surface and the seismic record of the ground. The high-resolution of the seismic record of the migrated profiling record for the SX-line seismic profile is evaluated, $W(f)=G(f) S^{-1}(f)$. $G(f)$ is the Fourier transform of the SX-line seismic profile $g(f)$, and the sampling interval of the time of $g(f)$ is 1 ms. The result $w(t)$, which was compensated by the attenuation and the wave dispersion of the de-convolution seismic wave at the near-surface, is obtained by the reversed Fourier transform. The result, which reflects different geologic features, is obtained by the band-pass filtering.

The huge attenuation and the wave dispersion of the seismic wave at the near-surface of the ground may be compensated after this method is administered. The duration of the seismic wavelet is shortened greatly. The apparent dominant frequency of the conventional SX seismic profiling $g(t)$ reaches 240 Hz, which is shown in FIG. 2. However, the apparent dominant frequency of the conventional SX is only 55 Hz, which is shown in FIG. 3. The data shown in FIG. 2 adapts to the prior data of the exploratory well better. Therefore, this method can improve the resolution greatly, and resolve the problem that it is difficult to recognize the thin layer by the present seismic exploration. When this method is processing, the structural characteristics on the profiling, such as fault, crease etc., are clear, the phenomena of the lithologic sequence stratigraphy, such as superior, progradation, watercourse etc., are evident, and it has an importance to the seismic reservoir forecasting, the petroleum detection of the seismic, etc. . . .

It is noted that the present sampling interval of the surface seismic data is only 1 ms. According to the Nyquist sampling theorem, if the change of the ground altitude or the lithology is large, this range is small; if the change of the altitude or the lithology is small, this range may be very large. The de-convolution operator of the near-surface between the borehole seismic surveys may be obtained by interpolation.

Moreover, the ground seismic record $g(t)$ in step (4) may be the seismic record of the seismic exploration either on shore or off shore. The said ground seismic record is shown s the seismic record of the demodulator probe of the ground seismic data, or the result that static corrected by the seismic record of the demodulator probe. It may be the seismic profiling either before the level of the ground seismic stacked or migrated. The regular processing methods, such as normal moveout correction, stacking and migration, may take place after the method for improving the seismic resolution is administered.

The expression of geologic interpretation in above step (5) is the structural interpretation, the lithologic sequence stratigraphy, the reservoir forecasting, the seismic petroleum detection and so on, which are in the developing field of petroleum exploration.

This inversion has the following useful effects: since the huge attenuation and the wave dispersion of the seismic wave at the near-surface of the ground may be compensated by using this method, the duration of the seismic wave may be greatly shortened. The apparent dominant frequency of the seismic data can reach 200 Hz and higher, which enhances the vertical seismic resolution greatly, resolves the problem that it is difficult to recognize the thin layer in the present seismic exploration, and has importance to the structural interpretation, the lithologic sequence stratigraphy, the reservoir forecasting, the seismic petroleum detection and so on, which are in the developing field of petroleum exploration.

DETAILED DESCRIPTION OF THE INVENTION

According to the above description of the context of the present invention and the further description of the following example, a person skilled in the art can envisage the object of the present invention. However, this example is only a part of the present invention, which does not limit the range of protection of the present invention.

The object of the following example is to improve the seismic resolution by the said vertical seismic resolution of the seismic profiling, which is obtained by adopting the principle of the present invention, in order to show actual improvement over the regular seismic profiling. It is well-known to those of skill in the art that an event in a seismic profile is measured as being from the top of the peak (black in the figures) to the bottom of the trough (white in the figures).

Figure 1:
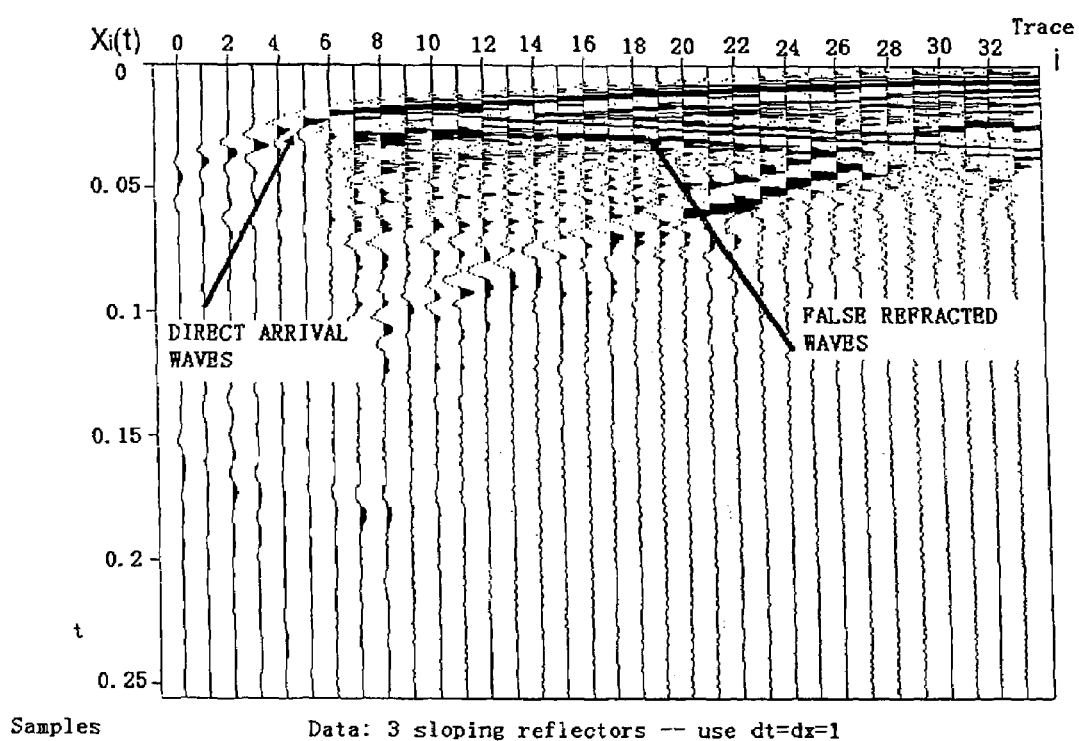
FIG. 1 is the diagram of the vertical seismic record obtained in accordance with the present invention.
Figure 2:
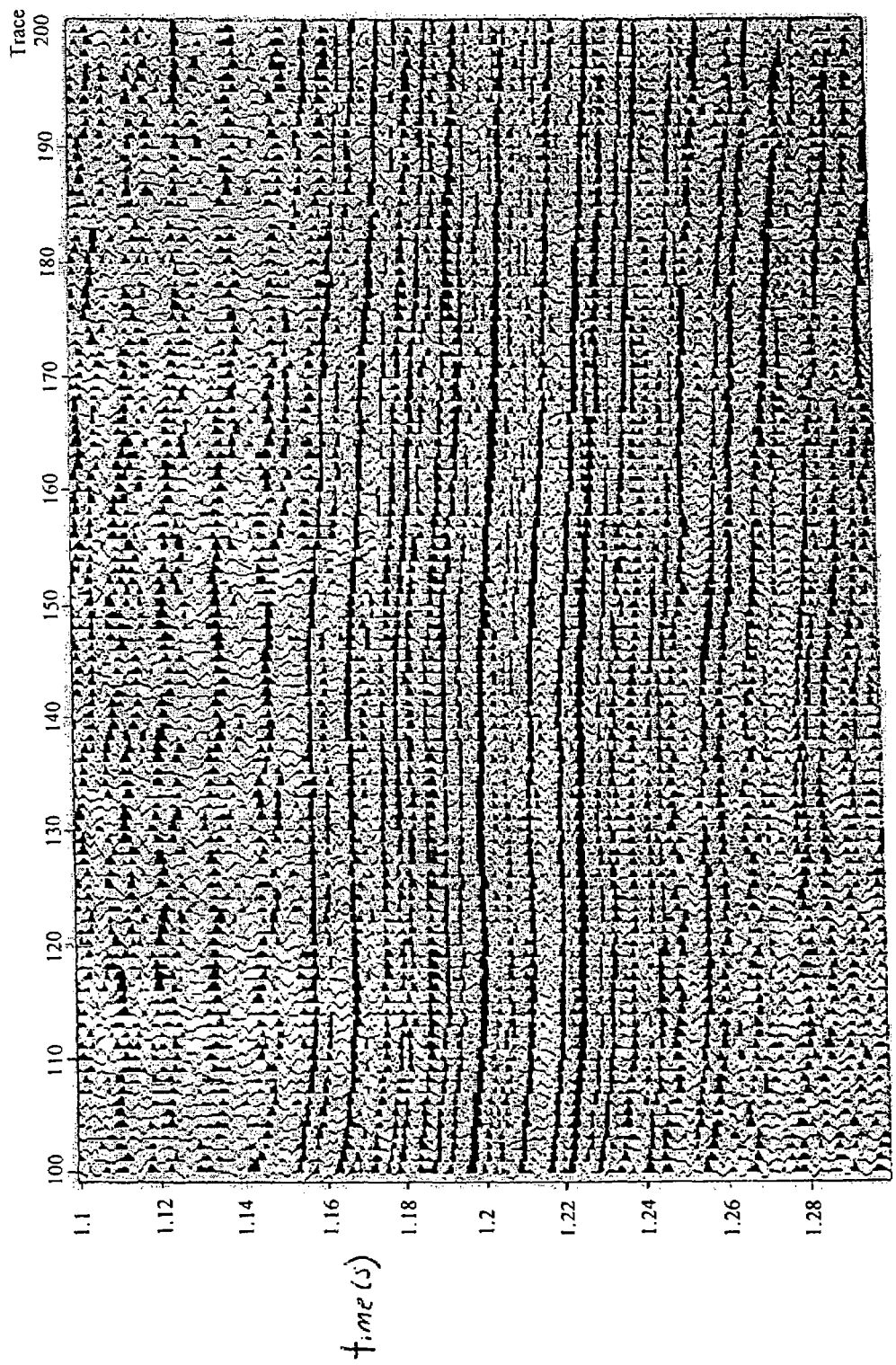
FIG. 2 is the diagram of the seismic migrated profiling obtained in accordance with the present invention.
Figure 3:
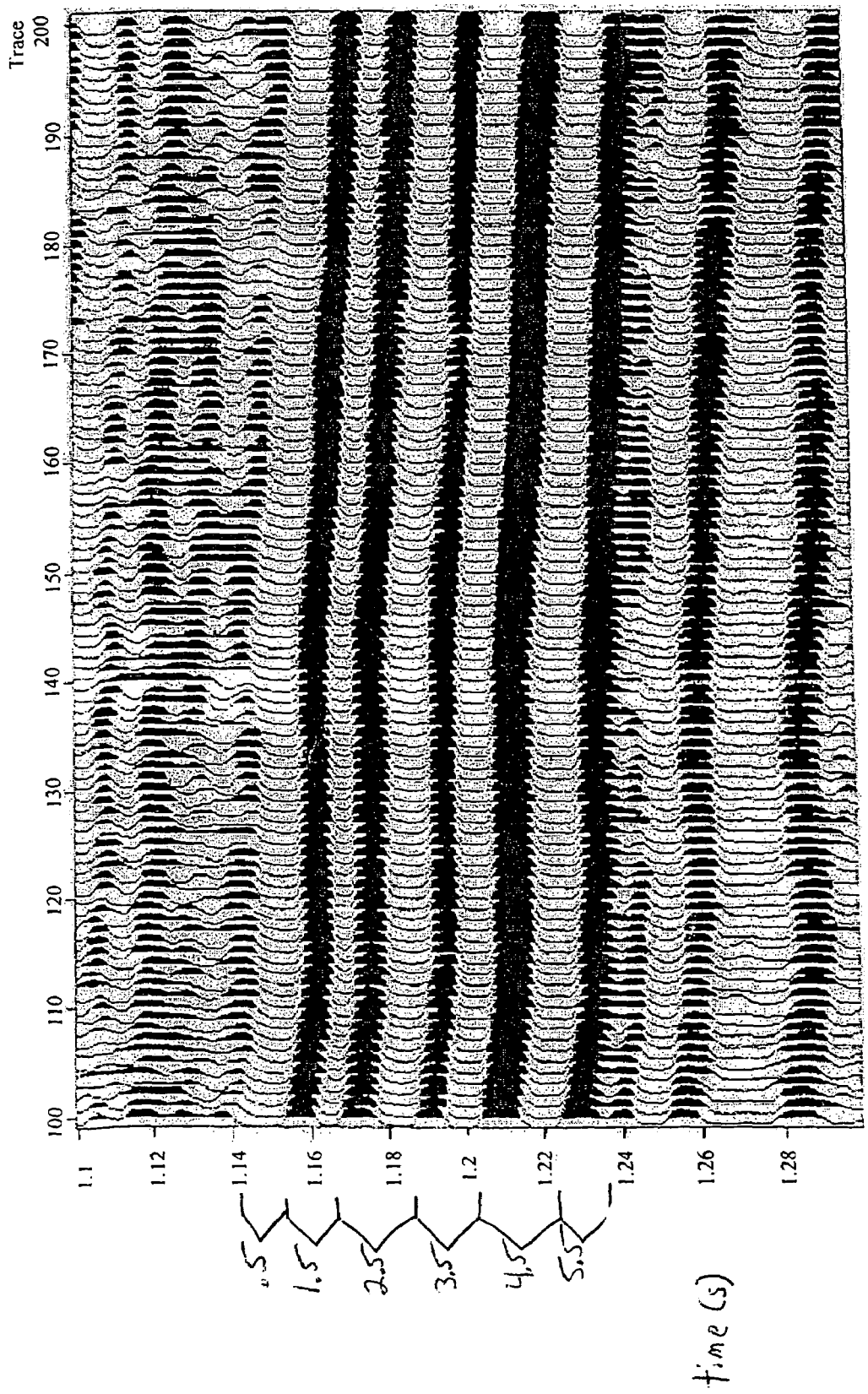
FIG. 3 is the diagram of the seismic migrated profiling obtained in accordance with the prior art.

According to the step (1) of the said method of the present invention, the vertical seismic record-$x_i(t)$ is obtained at the near-surface in the S area by using the cross borehole seismic survey, as shown in FIG. 1. The distance between the two logs is 4 m, the depth of the excited point is between 0.5 m and 34 m. The distance between the excited points is 1 meter, and the total guns are 33. The excited resource is made of a detonator, the depth of the received log is 34 meters, the largest width of the frequency, which can be recorded, is 500 Hz. The effect of the seismic profiling, in which the dominant frequency obtained in the present example is reached to 240 Hz, is great. If the seismic resolution is required to improve further, it should improve the sampling interval of the ground seismic data to 0.5 ms, 0.25 ms.

What is claimed is:

1. A method for improving the seismic resolution, characterized in comprising the steps of:
   a. obtaining a vertical seismic record $x_i(t)$ at the near-surface of the ground by using a borehole seismic survey, ensuring the depth and the velocity of a low-velocity layer and a high-velocity layer and characteristic of the frequency spectrum of a seismic wave at said near-surface of the ground, wherein:
      i. $x_0(t)$ is the curve of the vertical seismic record at said near-surface of the ground when i=0, and wherein said seismic record indicates the physical characteristics of said ground surface; and wherein
      ii. $x_n(t)$ is the curve of the vertical seismic record at said near-surface of the ground when i=n, wherein said n is a certain depth, and wherein said seismic record indicates the physical characteristics of said high-velocity layer at said certain base level depth below said low-velocity layer;
   b. separating a ghost wave of $x_i(t)$ from said high-velocity layer by using vertical seismic profiling, improving the signal-to-noise ratio (SNR) of said seismic record of said direct wave $x_n(t)$ at said high-velocity layer, wherein the values of ... $x_{n-2}(t)$, $x_{n-1}(t)$, $x_{n+1}(t)$, $x_{n+2}(t)$ ... are static corrected to the same time of the seismic record of $x_n(t)$, the values of ... $x_{n-2}(t)$, $x_{n-1}(t)$, $x_{n+1}(t)$, $x_{n+2}(t)$ ... are stacked, providing a static correction to said $x_0(t)$ seismic record;
   c. establishing a convolution math-physics equation between the seismic waves of said borehole seismic survey $x_0(t)$ and $x_n(t)$, $x_0(t)=x_n(t)* s(t)$, or $X_0(f)=X_n(f) S(f)$, evaluating a de-convolution operator of the near-surface: $s^{-1}(t)=x_n(t)* x_0^{-1}(t)$, or $S^{-1}(f)=X_n(f)X_0^{-1}(f)$, wherein $X_0(f)$ is a Fourier transform of $x_0(t)$, $X_n(f)$ is a Fourier transform of $x_n(t)$, s(t) is said convolution operator of said near-surface, S(f) is a Fourier transform of s(t);
   d. establishing a de-convolution math-physics equation of said seismic record around said ground of said borehole seismic survey using said de-convolution operator of said near-surface and said seismic record of said ground, evaluating said high resolution of said seismic record, $w(t)=g(t)* s^{-1}(t)$, or $W(f)=G(f)S^{-1}(f)$, wherein g(t) is said seismic record of said ground, G(f) is a Fourier transform of g(t), w(t) is a seismic record of the high resolution, said high resolution being attained after compensating the attenuation of said near-surface seismic wave by said de-convolution operator, and W(f) is a Fourier transform of w(t);
   e. providing band-pass filtering and geologic interpretation to said seismic record with high resolution evaluated
   wherein said stacking in step (b) is to correct statically values of ... $x_{n-2}(t)$, $x_{n+1}(t)$, $x_{n+2}(t)$ ... to the same time of said seismic record of $x_n(t)$ by using said velocity of said high-velocity layer and stacking said values of ... $x_{n-2}(t)$, $x_{n-1}(t)$, $x_{n+1}(t)$, $x_{n+2}(t)$ ... to improve said SNR of said direct wave $x_n(t)$; and
   wherein said borehole seismic survey includes an uphole seismic survey or a cross borehole seismic survey, wherein when the cross borehole seismic survey is used the distance between the two logs in said cross borehole seismic survey is 4 m, said depth of said exited point is between 0.5 m and 34 m, said distance between said excited points is 1 meter, and the total guns are 33, wherein an excited resource is made of a detonator, and the depth of a received log is 34 m.

* * * * *